United States Patent [19]

Rodgers

[11] Patent Number: 4,489,882
[45] Date of Patent: Dec. 25, 1984

[54] VARIABLE TIME CONSTANT ANTICIPATION THERMOSTAT

[75] Inventor: Larry C. Rodgers, Circle Pines, Minn.

[73] Assignee: Honeywell Inc., Minneapolis, Minn.

[21] Appl. No.: 472,419

[22] Filed: Mar. 4, 1983

[51] Int. Cl.³ .............................................. F24F 3/14
[52] U.S. Cl. .............................. 236/78 D; 236/68 B; 307/117
[58] Field of Search ................. 236/68 B, 78 R, 78 D; 219/511; 337/377; 165/26; 364/557; 307/117

[56] References Cited

U.S. PATENT DOCUMENTS 3,861,589  1/1975  Carlson ............................ 236/68 B
4,254,906  3/1981  Hayes ............................... 236/68 B Primary Examiner—William E. Wayner
Attorney, Agent, or Firm—Mitchell J. Halista; Trevor B. Joike

[57] ABSTRACT

A thermostat uses a source of a signal representing anticipation heat which is transmitted to a circuit to be combined with a signal from a temperature sensing element with a first time constant or delay when the thermostat is "ON", i.e., controlling a heat source to supply heat to a heat receiver and with a different time constant or delay when the thermostat is "OFF", i.e., controlling the heat source to interrupt the supply of heat to the heat receiver. This variable time constant provides a greater proportion of the anticipation or feedback of the anticipation signal to be combined with the signal from the temperature sensing element circuit at light loads of the temperature or heat producing element in the heat source to improve the stability of the heat control system since stability is generally increased with increased feedback without increasing the total anticipation heat representing signal whereby to minimize the system control point offset or droop which is the control band in which the control action of the thermostat takes place between the start of the "on" operation and the full "on" operation.

8 Claims, 4 Drawing Figures

VARIABLE TIME CONSTANT ANTICIPATION THERMOSTAT

BACKGROUND OF THE INVENTION

1. Field of the Invention

The present invention relates to thermostats. More specifically, the present invention is directed to anticipation type thermostats having a feedback of anticipation heat.

SUMMARY OF THE INVENTION

An object of the present invention is to provide an improved anticipation thermostat having a variable time constant of anticipation feedback.

In accomplishing this and other objects, there has been provided, in accordance with the present invention, a variable time constant anticipation thermostat having a first time constant for anticipation heat feedback during an ON time of the thermostat and having a second time constant different from the first time constant for anticipation heat feedback during an OFF time of the thermostat.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Detailed Description

Figure 1:
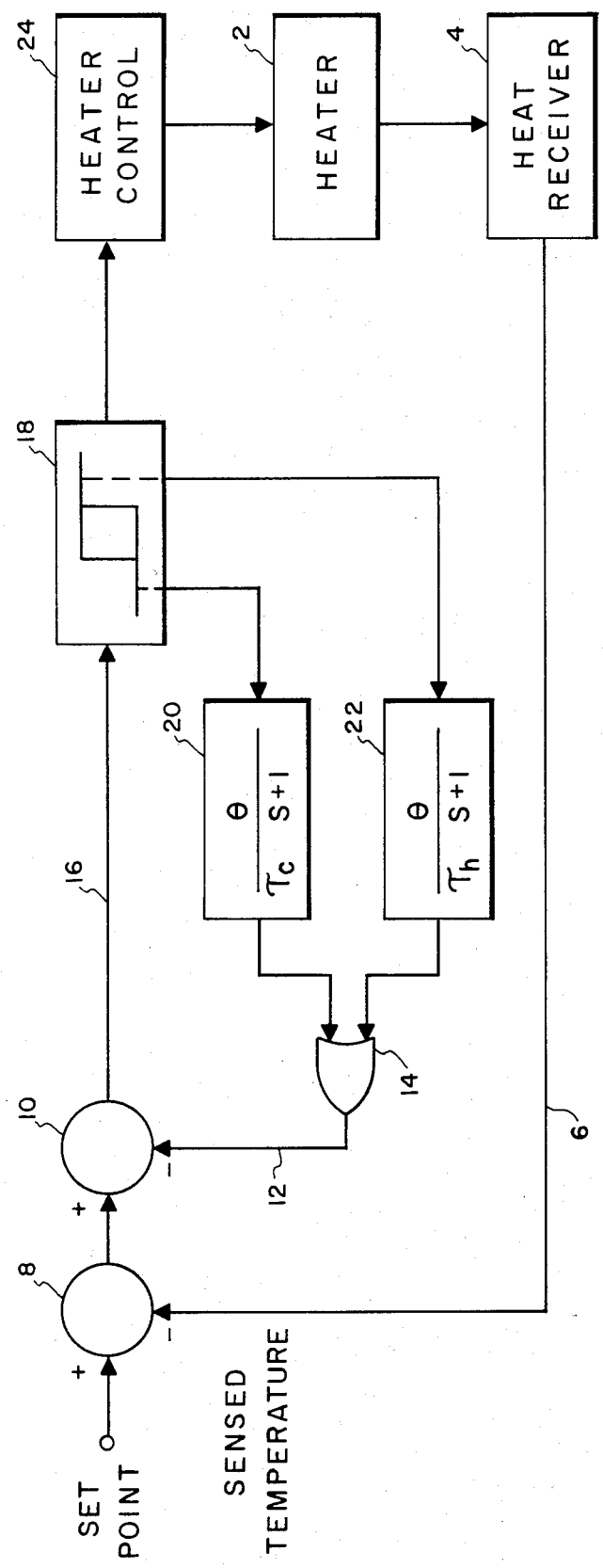
FIG. 1 is a control system schematic for an anticipation thermostat embodying an example of the present invention.

Referring to FIG. 1 in more detail, there is shown a control schematic of an anticipation thermostat embodying an example of the present invention for controlling the heat produced by a heater 2, e.g., a furnace, which heat is supplied to a heat receiver 4, e.g., a house. A sensed temperature signal from a temperature sensor in the heat receiver 4 is supplied on a signal line 6 to a first signal summing junction 8. A setpoint signal from a setpoint source (not shown) is also supplied to the first summing junction 8. The difference between the setpoint signal and the sensed temperature signal is produced as an output from the summing junction 8 and is supplied as a first input to a second summing junction 10. A second input to the second summing junction 10 is supplied on a signal line 12 from an output of an OR gate 14. An output signal from the second summing junction 10 is supplied over output line 16 to an ON/OFF control 18 having a hysteresis type operation, such controls being well-known in the art. The hysteresis is used to prevent the controller 18 from hunting or "chattering."

An output signal from the hysteresis type controller 18 during its "OFF" or non-heating mode of operation is sensed by a first time constant feedback circuit 20 to supply a first anticipation feedback signal during the "OFF" time of the control circuit 18. A second time constant feedback circuit 22 is used to supply a second anticipation feedback signal during the "ON" or heating mode of operation of the control 18. The outputs of the first and second time constant feedback circuits 20, 22 are supplied as inputs to the OR gate 14.

In conventional electromechanical thermostats the anticipation heat is supplied as an energizing signal to a heater located adjacent to the temperature sensing element with the heater being energized so as to anticipate the effect of the main heater supplying heat to the heat receiver. In such thermostats, the anticipation heat signal is transmitted with a single fixed time constant. In the present invention, the anticipation heat is supplied as a signal representative of anticipation heat and is combined with an output signal from the temperature sensing element rather than being used to energize the aforesaid heater adjacent to the temperature sensing element. Additionally, the time constant for the anticipation heat respresentative signal is varied between the "on" time of the thermostat and the "off" time of the thermostat. The feedback circuits 20 and 22 are used to provide the two different time constants for the feedback signal. By utilizing a larger proportion of the feedback signal at low heating loads or small "on" times of the thermostat, the system stability is increased in accordance with the general control system rule that system stability is increased with increased feedback.

The first time constant feedback is shown in block 20 as:

$$\theta/[\tau_c(S+1)]$$

Where $\theta$ is the quantity of anticipation feedback signal, $\tau_c$ is the "OFF" time constant and S is the Laplace transform operator. Similarly, the anticipation signal for the "ON" mode uses an "ON" time constant $\tau_h$ with the form of the time constant feedback as shown in block 22 as:

$$\theta/[\tau_h(S+1)]$$

Using the aforesaid system, the time constant for the anticipation signal to the OR gate 14 and the summing junction 10 during the "ON" mode of operation is different from the "OFF" mode of operation.

Figure 2:
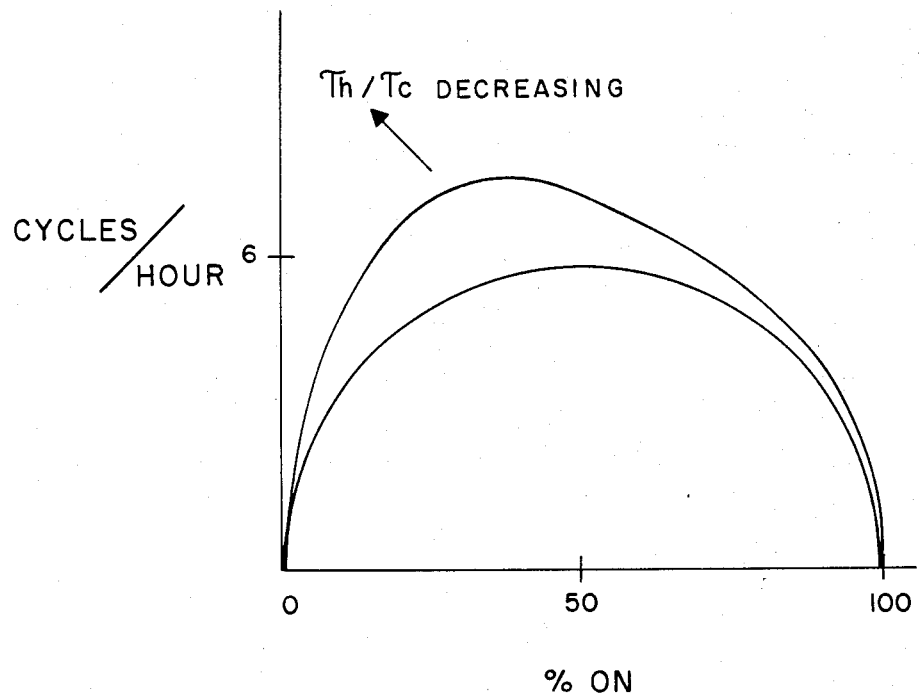
FIGS. 2 and 3 are performance curves for the control system shown in FIG. 1
Figure 3:
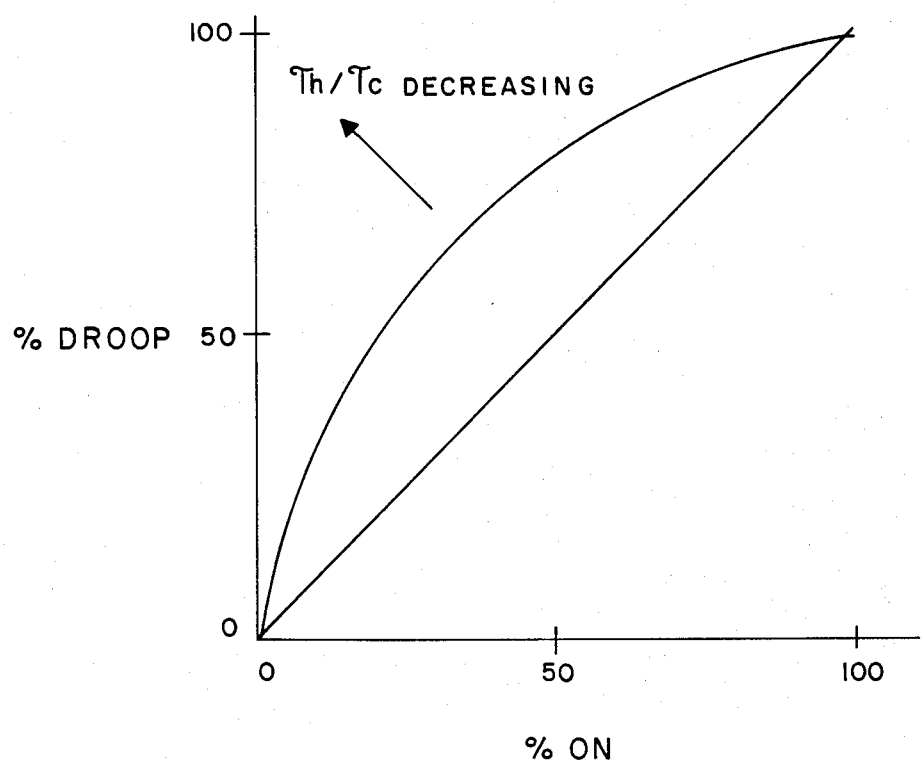

In FIG. 2, there is shown a performance curve comparing the "% ON" time of the heater 2 to the cycles per hour of the control 18 with an indication of the effect of decreasing the ratio of the time constant $\tau_h$ of the "ON" mode to the time constant of $\tau_c$ of the "OFF" mode. In FIG. 3, there is shown a curve comparing the percent of the system droop to the "% ON" time with a representation of the effect of decreasing the ratio of the time constant for the "ON" mode $\tau_h$ to the time constant for the "OFF" mode $\tau_c$. In this figure it may be seen that the system feedback at low "on" times is approximately double that of a system without the variable time constant capabilities of the present invention with the conventional fixed time constant system being represented by the straight line in FIG. 3. Thus, by utilizing the variable time constant of the present invention, the overall system stability is increased.

Figure 4:
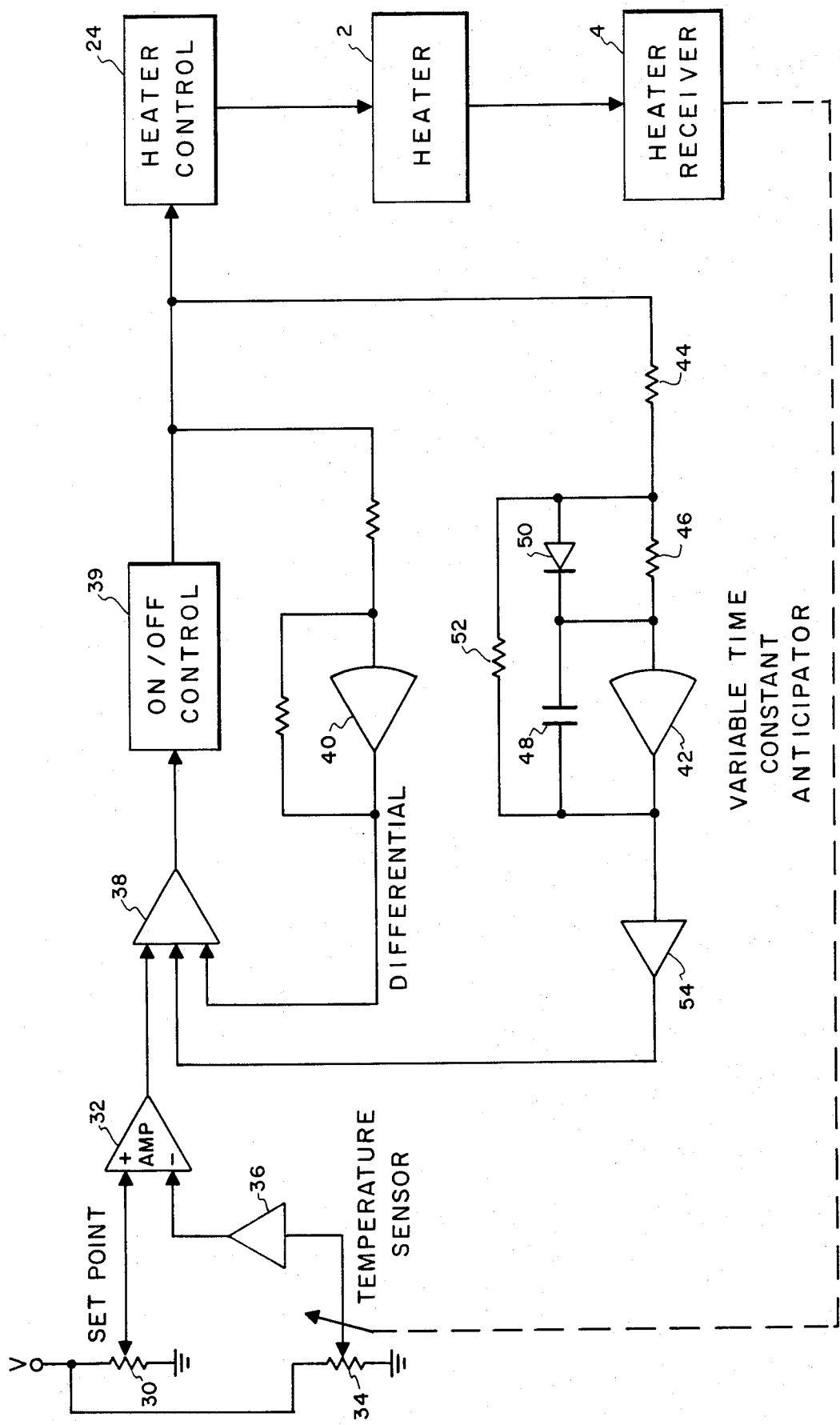
FIG. 4 is a schematic diagram of an anticipation thermostat embodying the control system shown in FIG. 1.

In FIG. 4, there is shown a schematic diagram of an electronic embodiment of the control system shown in FIG. 1. Similar reference numbers have been used in FIG. 4 to indicate elements similar to those found in FIG. 1. A setpoint potentiometer 30 is used to provide a temperature setpoint signal to a summing amplifier 32. A temperature sensor potentiometer 34 is used to provide a signal representative of the temperature in the heat receiver 4 which is arranged to vary the slider on the potentiometer 34. The output from the potentiometer 34 is applied through an amplifier 36 used as a polarity inverter to a second input of the summing amplifier 32. The output from the amplifier 32 is applied as one input to a three input summing amplifier 38. The output from the summing amplifier 38 is applied to the input of an ON/OFF controller 39 which is used to control the heater control 24.

A second input to the amplifier 38 is supplied from the output of an ON/OFF control 18 through a second polarity inverting amplifier 40 which provides the differential or hysteresis shown in element 18 in FIG. 1. Thus, the ON/OFF controller 39 in combination with the differential amplifier 40 supplies the function of element 18 shown in FIG. 1. A third input to the three input amplifier 38 is supplied from the output of the ON/OFF control 18 through a variable time constant anticipator circuit including an amplifier 42 having a series connection of input resistors 44 and 46 and a series connection of a capacitor 48 and a diode 50 arranged to feedback a signal from the output of the amplifier 42 to the input thereof. Specifically, the diode 50 is connected across the second input resistor 46 while the capacitor 48 is connected directly across the amplifier 42. The capacitor 48 and diode 50 are bridged by a fixed resistor 52. The output from the amplifier 42 is applied through a third inverter 54 to the third input of the summing amplifier 38.

In operation, the diode 50 is used to provide the change in time constant from the "ON" mode to "OFF" mode. When the controller 39 is "ON", the diode 50 is conducting to short circuit the resistor 46. When the controller 39 is "OFF", the diode 50 is non-conducting, and the resistor 46 is added to the time constant of the feedback circuit, i.e., $$\tau_h = R_{52}C_{48}$$

$$\tau_c = R_{52}(R_{46}+R_{44}) + R_{46}R_{44}$$

Thus, while anticipator circuits using positive feedback are well-known to enhance system performance be overcoming a slow response of a temperature or a heat receiver, e.g., the electromechanical thermostat having a heater adjacent to a temperature sensing element which heater is energized by the feedback signal, the variable time constant anticipator of the present invention provides an improved response by distinguishing between the "ON" and "OFF" modes of operation to enhance the heating system performance without increasing the magnitude of the anticipation signal, i.e., the anticipation heat.

Accordingly, it may be seen that there has been provided, in accordance with the present invention, an improved anticipation type thermostat.

The embodiments of the invention in which an exclusive property or privilege is claimed are defined as follows:

1. A thermostat comprising
   a first signal summing means for producing an output representative of the difference between a temperature setpoint and a sensed temperature.
   a second signal summing means for producing an output representative of the difference between the output from said first summing means and a temperature anticipation signal,
   ON-OFF heater control means responsive to the output of the second summing means for producing a heater control signal during an ON mode of operation and during an OFF mode of operation,
   first feedback means for producing a feedback of a first anticipation signal having a first time constant from the output of said control means during the OFF operating mode of said control means,
   second feedback means for producing a feedback of a second anticipation signal having a second time constant different from said first time constant from the output of said control means during the ON operating mode of said control means, and
   means for applying an output from said first and second feedback means as said temperature anticipation signal to said second summing means.

2. A thermostat as set forth in claim 1 wherein said ON-OFF heater control means includes a differential means for introducing a hysteresis effect between the ON and OFF modes of operation.

3. A thermostat as set forth in claim 2 wherein said second summing means includes a three input summing amplifier for an output from said differential means with the output of said first summing means and the temperature anticipation signal.

4. An anticipation thermostat comprising
   means for providing an anticipation heat feedback signal with a first time constant during an ON time of the thermostat and
   means for providing an anticipation heat feedback signal with a second time constant different from said first time constant during an OFF time of the thermostat.

5. An anticipation thermostat as set forth in claim 4 and further including differential means for introducing hysteresis between said ON and OFF times of operation of the thermostat.

6. An anticipation thermostat as set forth in claim 4 and including first means for producing a first output signal in response to a sensed temperature and a setpoint temperature, second means responsive to said first output signal and said feedback signal to produce a second output signal and heater control means responsive to said second output signal for producing a heater control signal to control the production of heat.

7. A method of operating a heater control system including the steps of summing a temperature sensor signal representative of a temperature affected by the heater, a temperature set-point signal and a feedback signal representative of heat anticipation of the heat provided by the heater, applying the result of the summing operation to heater control means to produce first and second modes of operation of the heater to control the production of heat provided by the heater, feeding back a first feedback signal for the summing operation having a first time constant during the first mode of operation and feeding back a second feedback signal for the summing operation having a second time constant different from the first time constant during the second mode of operation.

8. A method as set forth in claim 7 wherein the first mode of operation is an ON mode of operation and the second mode of operation is an OFF mode of operation.

* * * * *